United States Patent [19]

Bäbler

[11] 4,404,385
[45] Sep. 13, 1983

[54] NOVEL MODIFICATION OF PERYLENETETRACARBOXYLIC ACID-BIS-(3,5-DIMETHYLPHENYL)IMIDE

[75] Inventor: Fridolin Bäbler, Allschwil, Switzerland

[73] Assignee: Ciba-Geigy Corporation, Ardsley, N.Y.

[21] Appl. No.: 161,965

[22] Filed: Jun. 23, 1980

[30] Foreign Application Priority Data

Jul. 4, 1979 [CH]  Switzerland ........................ 6242/79
Jul. 5, 1979 [CH]  Switzerland ........................ 6293/79

[51] Int. Cl.³ ...................... C07D 487/06; D06P 3/79; D06P 3/62; D06P 3/26
[52] U.S. Cl. .................................. 546/37; 260/39 P; 260/42.21; 260/37 SB; 260/40 R; 260/38; 260/37 EP; 260/37 N; 260/37 R; 106/204; 8/568; 524/90
[58] Field of Search ......................................... 546/37

[56] References Cited

U.S. PATENT DOCUMENTS 4,230,858  10/1980  Gall ...................................... 546/37

FOREIGN PATENT DOCUMENTS 1807729  6/1970  Fed. Rep. of Germany .
1067157  4/1976  Fed. Rep. of Germany .
50-06848  3/1975  Japan .................................... 546/37
51-07025  4/1976  Japan .

OTHER PUBLICATIONS

Niyaka et al., Khimiya; Technol. Krasheniya, Sinteza Krasitelei i Polymer. Malerialov 1978, 67–72.

*Primary Examiner*—Mark L. Berch
*Attorney, Agent, or Firm*—Luther A. R. Hall

[57] ABSTRACT

Perylenetetracarboxylic acid-bis-(3,5-dimethylphenyl)imide in a novel γ-modification characterized by an X-ray diffraction spectrum exhibiting very strong lines at interplanar spacings of 8.3, 3.61, 3.46 and 3.30 Å, and strong lines at interplanar spacings of 17.2, 10.3, 7.2, 6.7 and 4.09.

The pigment is suitable for dyeing high-molecular organic material. Compared with the known yellowish-red modifications, the γ-modification is characterized by a bluish-red shade.

5 Claims, No Drawings

NOVEL MODIFICATION OF PERYLENETETRACARBOXYLIC ACID-BIS-(3,5-DIMETHYLPHENYL)IMIDE

The production of perylenetetracarboxylic acid-bis-(3,5-dimethylphenyl)-imide by condensation of perylenetetracarboxylic acid dianhydride with 3,5-dimethylaniline and concentrated hydrochloric acid is described in the German Patent Specification No. 1,067,157. The yellowish-red α-modification obtainable by this process shows the following X-ray diffraction diagram:

| Line | Interplanar spacing (d) in Angstrom units | Intensity |
|---|---|---|
| 1 | 16.9 | strong |
| 2 | 8.6 | medium |
| 3 | 7.8 | very weak |
| 4 | 7.5 | very weak |
| 5 | 6.2 | very strong |
| 6 | 5.87 | weak |
| 7 | 4.69 | strong |
| 8 | 4.54 | medium |
| 9 | 4.23 | very weak |
| 10 | 4.14 | weak |
| 11 | 3.83 | strong |
| 12 | 3.72 | medium |
| 13 | 3.64 | strong |
| 14 | 3.44 | very strong |
| 15 | 3.16 | strong |
| 16 | 3.10 | weak |
| 17 | 3.05 | very weak |

To determine the interplanar spacings (d values), the diffraction pattern was recorded on film (films 235–79 and 236–79). A Guinier-DeWolff No. 2 camera with Cu-K-alpha radiation (lambda=1.54178 Angström units) was used for the recording. The calibration substance employed was alpha quartz, the d-values of which being calculated from A=4.913 Angström units and C=5.405 Angström units (PDF-0490). The relative line intensities are assessed visually.

The β-modification of perylenetetracarboxylic acid-bis-(3,5-dimethylphenyl)-imide is described in the Japanese Published Specification No. 51/7025. It is obtained by treatment of the α-modification, produced by dissolving and crystallising the compound, with inert high-boiling organic solvents. The X-ray diffraction spectrum shows the following composition:

| Line | d (Å) | Intensity |
|---|---|---|
| 1 | 15.8 | medium |
| 2 | 11.1 | weak |
| 3 | 9.5 | strong |
| 4 | 7.83 | medium |
| 5 | 6.51 | weak |
| 6 | 6.07 | weak |
| 7 | 5.57 | weak |
| 8 | 4.93 | weak |
| 9 | 4.53 | weak |
| 10 | 4.27 | medium |
| 11 | 4.10 | weak |
| 12 | 3.97 | weak |
| 13 | 3.88 | weak |
| 14 | 3.74 | weak |
| 15 | 3.66 | medium |
| 16 | 3.55 | medium |
| 17 | 3.39 | weak |
| 18 | 3.30 | weak |
| 19 | 3.23 | weak |

There has now been found a further modification of perylenetetracarboxylic acid-bis-(3,5-dimethylphenyl)-imide, which, by analogy with the aforementioned publications, is designated as the γ-modification, and which is characterised by the following X-ray diffraction spectrum:

| Line | Interplanar spacing (d) in Angstrom units | Intensity |
|---|---|---|
| 1 | 17.2 | strong |
| 2 | 10.3 | strong |
| 3 | 9.8 | medium |
| 4 | 8.3 | very strong |
| 5 | 7.2 | strong |
| 6 | 6.7 | strong |
| 7 | 6.2 | very weak |
| 8 | 6.1 | very weak |
| 9 | 5.55 | medium |
| 10 | 5.29 | weak |
| 11 | 5.09 | medium |
| 12 | 4.83 | very weak |
| 13 | 4.64 | weak |
| 14 | 4.49 | weak |
| 15 | 4.34 | weak |
| 16 | 4.27 | weak |
| 17 | 4.09 | strong |
| 18 | 3.90 | medium |
| 19 | 3.84 | medium |
| 20 | 3.74 | weak |
| 21 | 3.61 | very strong |
| 22 | 3.54 | weak |
| 23 | 3.46 | very strong |
| 24 | 3.38 | very weak |
| 25 | 3.30 | very strong |
| 26 | 3.21 | medium |
| 27 | 3.16 | very weak |
| 28 | 3.10 | very weak |
| 29 | 3.04 | very weak |

Depending on crystallinity, weak lines can become diffused or disappear.

The novel γ-modification, which, compared with the modifications hitherto known, is distinguished by a clear colour change, from yellowish to bluish red, which is of interest for coloristic application, with retention of the good pigment properties, can be obtained, in direct synthesis, by condensation of perylenetetracarboxylic acid dianhydride in excess with 3,5-dimethylaniline, in the absence of an inert organic solvent but in the presence of a condensation agent, particularly in the presence of a cadmium or zinc salt of an organic acid, preferably zinc acetate or zinc formate.

Condensation is effected by heating the components, advantageously to 180° to 220° C., the water forming during the condensation reaction being distilled off. Further processing advantageously comprises the addition of alcohol to the cooled reaction mixture, separation of the pigment suspension by filtration, and removal of the excess amine by washing with dilute hydrochloric acid.

The novel γ-form is obtained also by treatment of the known α- and/or β-form with trifluoroacetic acid. This is performed by stirring up for example the α-form in pure trifluoroacetic acid or in an admixture of this with aprotic organic solvents, for example aromatic hydrocarbons such as toluene, or halogenated hydrocarbons such as chlorobenzene or o-dichlorobenzene, at reflux temperature for several hours, and isolating the pigment in the novel γ-modification by filtering the suspension. With the use of pure trifluoroacetic acid, it is possible to isolate the pigment, after completion of the modification conversion into the novel γ-form, by direct evaporation of the trifluoroacetic acid or by dilution of the pigment suspension with water or with an organic solvent, such as methanol, ethanol or isoproanol, and filtration.

The novel γ-modification of perylenetetracarboxylic acid-bis-(3,5-dimethylphenyl)-imide is characterised by high colouring strength and by excellent fastness to heat and to light, as well as by a valuable bluish-red shade, which renders possible its application in place of the highly fast Cd pigments. In contrast to the α and β-modifications, the novel γ-modification enables PE injection-moulded articles to be dyed distortion-free without special aftertreatments. Furthermore, it is possible by using the novel γ-modification in admixture with other pigments to produce shades which cannot be obtained either with the α-modification or with the β-modification.

The novel γ-modification is suitable for pigmenting highly molecular organic material, thermoplastic and duro plastics, such as cellulose ether and cellulose ester, such as ethylcellulose, nitrocellulose, cellulose acetate, cellulose butyrate, natural resins or synthetic resins, such as polymerisation resins or condensation resins, for example aminoplasts, particularly urea- and melamine-formaldehyde resins, alkyd resins, phenoplasts, polycarbonates, polyolefins, such as polystyrene, polyvinyl chloride, polyethylene, polypropylene, polyacrylonitrile, polyacrylate, polyamides, polyurethanes or polyesters, rubber, casein, silicone and silicone resins, singly or in admixtures.

The highly molecular compounds mentioned can be in the form of plastic materials or melts, or in the form of spinning solutions, lacquers, coating compounds or printing pastes. Depending on the purpose of application, it proves advantageous to use the novel pigments as toners or in the form of preparations.

It is possible to produce with the novel γ-modification, depending on the size of the pigment crystals, either highly transparent dyeings or covering dyeings. Thus, the pigment can be converted for example by grinding or kneading into a finer form, or into a coarser form by treatment with organic solvents in the presence or absence of water, preferably at elevated temperature and/or optionally at a modified pressure.

By virtue of outstanding stability to heat and excellent fastness to light, the novel γ-modification proves to be a particularly valuable bluish red pigment for dyeing plastics, especially polyolefins, polyamides, polyesters and polyvinyl chloride, as well as lacquers. The resulting dyed fibres and objects have excellent fastness to light. The textile fastness properties too of the dyed fibres, for example fastness to washing, rubbing, thermofixing, chlorine and dry cleaning, are exceptionally good.

Except where otherwise stated in the following Examples, 'parts' are parts by weight and percentages are percent by weight, and temperatures are given in degrees Centigrade.

EXAMPLE 1

19.6 parts of perylenetetracarboxylic acid dianhydride, 121 parts of 3,5-dimethylaniline and 4 parts of zinc-acetate.2H$_2$O are heated together, in a vessel with stirrer, to 195°–205°, and are then stirred for one hour with the simultaneous removal of the reaction water by distillation. The reaction mixutre is cooled to 80°; it is subsequently diluted with 150 ml of ethanol, and the pigment suspension is filtered off after 10 minutes' stirring. The press cake is washed with 200 parts by volume of ethanol, then with dilute aqueous hydrochloric acid until free from amine and zinc salt, and dried in a vacuum drying chamber at about 80°. The yield is 28.5 parts of perylenetetracarboxylic acid-bis-(3,5-dimethylphenyl)-imide in the novel γ-modification, which, when incorporated into HP polyethylene injection-moulded articles, produces deeply coloured bluish-red dyeings having excellent fastnss properties.

EXAMPLE 2

11.8 parts of perylenetetracarboxylic acid dianhydride, 90 parts by volume of 3,5-dimethylaniline and 2.4 parts of zinc formate are heated together to 195°–200° C., and stirred for 6 hours at this temperature. The reaction mixture is cooled to 80°; it is subsequently diluted with 50 parts by volume of isopropanol, and the pigment suspension is filtered off. The press cake is washed with 250 parts by volume of isopropanol, then with dilute aqueous hydrochloric acid until free from amine and zinc salt, and dried in a vacuum drying chamber at 70°–80°. The yield is 16.5 parts of perylenetetracarboxylic acid-bis-(3,5-dimethylphenyl)imide in the novel γ-modification, which, optionally after incorporation into a preparation, is suitable for the melt dyeing of polyamide, polyester, polyacrylonitrile or polypropylene fibres. There are obtained fibres or objects which are dyed in a bluish-red shade and which have excellent fastness to light and outstanding textile fastness properties.

EXAMPLE 3

If the procedure is carried out in a manner analogous to that described in Example 2, using however 2.4 parts of cadmium acetate.2H$_2$O in place of 2.4 parts of zinc formate and stirring the reaction mixture for 2 hours at 195°–200°, there are obtained 17 parts of perylenetetracarboxylic acid-bis-(3,5-dimethylphenyl)-imide in the novel γ-modification, which has properties equally as good as those of the γ-modification produced in Example 2.

EXAMPLE 4

20 parts of the yellowish-red α-modification of perylenetetracarboxylic acid-bis-(3,5-dimethylphenyl)-imide in 160 parts by volume of trifluoroacetic acid are stirred for 18 hours at reflux temprature. The pigment suspension is afterwards cooled to room temperature, and is then poured with stirring into 440 parts of water. After 15 minutes' stirring, the suspension is filtered off and the press cake is washed neutral with water, and subsequently dried in a vacuum drying chamber at about 80°. There are obtained 19.7 parts of perylenetetracarboxylic acid-bis-(3,5-dimethylphenyl)-imide in the novel γ-modification which, when dyed into HP polyethylene in the injection-moulding process, yields deeply coloured bluish-red dyeings having excellent fastness to heat and to light.

EXAMPLE 5

20 parts of the yellowish-red α-modification in 200 parts by volume of toluene and 100 parts by volume of trifluoroacetic acid are stirred for 18 hours at reflux temperature. The pigment suspension is then cooled to 20° to 30° and filtered; the press cake is well washed with isopropanol and dried in a vacuum drying chamber at about 80°. The yield is 18 parts of perylenetetracarboxylic acid-bis-(3,5-dimethylphenyl)-imide in the novel γ-modification which, incorporated into soft PVC rolled sheets or into hard PVC, produces bluish-red dyeings having fastness to migration and to light.

EXAMPLE 6

A mixture of 1.0 part of the perylene pigment in the novel γ- modification obtained according to Example 1, 1.0 part of antioxidant IRGANOX 1010 (trade name of CIBA-GEIGY AG) and 1000.0 parts of polyethylene HP granulate, Vestolen A 60 to 16 (trade name of Hüls) are premixed for 15 minutes in a glass flask on a rolling device. The mixture is subsequently extruded in two passes on a single-shaft extruder; the granulate obtained is then injection moulded at 220° in an injection-moulding machine (Allround Aarburg 200) into the form of plates, and re-pressed for 5 minutes at 180°. The moulded plates, which exhibit neither distortion nor deformation, have deeply coloured bluish-red shades having excellent fastness properties.

EXAMPLE 7

If there are used, in place of 1.0 part of pure toner pigment, 2.0 parts of a 50% pigment preparation consisting of 1.0 part of the perylene pigment of the novel γ-modification obtained according to Example 2 and 1.0 part of magnesium behenate, the procedure otherwise being the same as that described in Example 4, there are obtained bluish-red moulded plates having equally good properties.

EXAMPLE 8

1000 parts of a polypropylene granulate (Daplen PT 55, trade name of Chemie Linz) and 20 parts of a 50% pigment preparation consisting of 10 parts of the perylene pigment of the novel γ-modification obtained according to Example 3 and 10 parts of magnesium behenate are thoroughly mixed together in a mixing drum. The granulate treated in this manner is spun at 280° to 285° by the melt-spinning process. There are obtained intensely bluish-red-dyed fibres having very good fastness to light and very good textile fastness properties.

EXAMPLE 9

For dyeing PVC there is produced a mixture of 65 parts of stabilised PVC, 35 parts of dioctyl phthalate, 0.2 part of the perylene pigment of the novel γ-modification obtained according to Examples 1 to 3, and this mixture is moved backwards and forwards for 5 minutes at about 150° between two rollers of a calender. The resulting soft PVC sheet displays a bluish-red dyeing having excellent fastness to light.

EXAMPLE 10

A mixture of 130 parts of steatite balls 8 mm diameter, 47.5 parts of alkyd melamine stoving lacquer consisting of 60 parts of Beckosol 27-320, 60% in xylene (Reichhold Chemie AG), 36 parts of Super-Beckamin 13-501, 50% (Reichhold Chemie AG), 2 parts of xylene and 2 parts of ethylene glycol monomethyl ether, and 2.5 parts of the perylene pigment of the novel γ-modification obtained according to Example 1 is dispersed in a 200 ml glass flask with twist-off cap for 120 hours on a tumbling device. After removal of the steatite balls, 2.4 parts of the full shade mixture dispersed in the manner described, 6.0 parts of titanium dioxide, Kronus RN 59 (Kronus Titan GmbH), and 24.0 parts of the above alkyd melamine stoving lacquer are mixed together; the mixture is then sprayed onto aluminium sheets and subsequently stoved at 130° for 30 minutes. Bluish-red dyeings having excellent fastness properties are obtained.

EXAMPLE 11

If the procedure is carried out in a manner analogous to that described in Example 8 except that 1000 parts of polyamide granulate (Grilon A 25, trade name of Emserwerke) are used in place of the polypropylene granulate, there are obtained bluish-red-dyed polyamide fibres having very good fastness to light and very good textile fastness properties.

EXAMPLE 12

1000 parts of polyethylene terephthalate granulate (Terlenka glänzend, trade name of ENKA) and 10 parts of the perylene pigment of the novel γ-modification produced according to Example 1 are thoroughly mixed together in a mixing drum, and afterwards dried for 24 hours at about 100° in vacuo at 15 mm Hg. The granulate treated in this manner is subsequently spun at about 290° in the melt-spinning process. Bluish-red-dyed fibres having excellent fastness to light and excellent textile fastness properties are obtained.

EXAMPLE 13

3 parts of the perylene pigment of the novel γ-modification obtained according to Example 1 are stirred in a finely prepared form into a spinning solution of 300 parts of polyacrylonitrile (Leacryl 16, trade name of Montefibre) in 700 parts of dimethylformamide, and the solution is subsequently spun using the dry spinning process. Bluish-red polyacrylonitrile fibres having excellent fastness to light and excellent textile fastness properties are obtained.

What is claimed is:
1. Perylenetetracarboxylic acid-bis-(3,5-dimethylphenyl)-imide in a γ-modification which is characterised by an X-ray diffraction spectrum exhibiting very strong lines at interplanar spacings of 8.3, 3.61, 3.46 and 3.30 Å, and strong lines at interplanar spacings of 17.2, 10.3, 7.2, 6.7 and 4.09 Å.
2. Perylenetetracarboxylic acid-bis-(3,5-dimethylphenyl)-imide according to claim 1, which exhibits lines of strong intensity at interplanar spacings of 17.2 and 10.3 Å, a line of medium intensity at 9.8 Å, a line of very strong intensity at 8.3 Å, lines of strong intensity at 7.2 and 6.7 Å, lines of very weak intensity at 6.2 and 6.1 Å, a line of medium intensity at 5.55 Å, a line of weak intensity at 5.29 Å, a line of medium intensity at 5.09 Å, a line of very weak intensity at 4.83 Å, lines of weak intensity at 4.64, 4.49, 4.34 and 4.27 Å, a line of strong intensity at 4.09 Å, lines of medium intensity at 3.90 and 3.84 Å, a line of weak intensity at 3.74 Å, a line of very strong intensity at 3.61 Å, a line of weak intensity at 3.54 Å, a line of very strong intensity at 3.46 Å, a line of very weak intensity at 3.38 Å, a line of very strong intensity at 3.30 Å, a line of medium intensity at 3.21 Å, and lines of very weak intensity at 3.16, 3.10 and 3.04 Å.
3. A process for producing the γ-modification according to claim 1, wherein the known α- or β-modification or mixture thereof is treated with trifluoroacetic acid.
4. A process for producing the γ-modification according to claim 1, wherein a suspension of the α- or β-modification or mixture thereof is stirred up for a few hours in trifluoroacetic acid.
5. A process for producing the γ-modification according to claim 1, wherein a suspension of the α- or β-modification or mixture thereof is stirred up for a few hours in a mixture consisting of trifluoroacetic acid and an aprotic organic solvent.

* * * * *